Oct. 6, 1942.                G. P. HADJILIAS                2,298,010
MARINE ARTIFICIAL HORIZON
Filed April 16, 1941                3 Sheets-Sheet 1

Inventor
George Paul Hadjilias

By Clarence A. O'Brien

Attorney

Oct. 6, 1942.　　　G. P. HADJILIAS　　　2,298,010
MARINE ARTIFICIAL HORIZON
Filed April 16, 1941　　　3 Sheets-Sheet 2
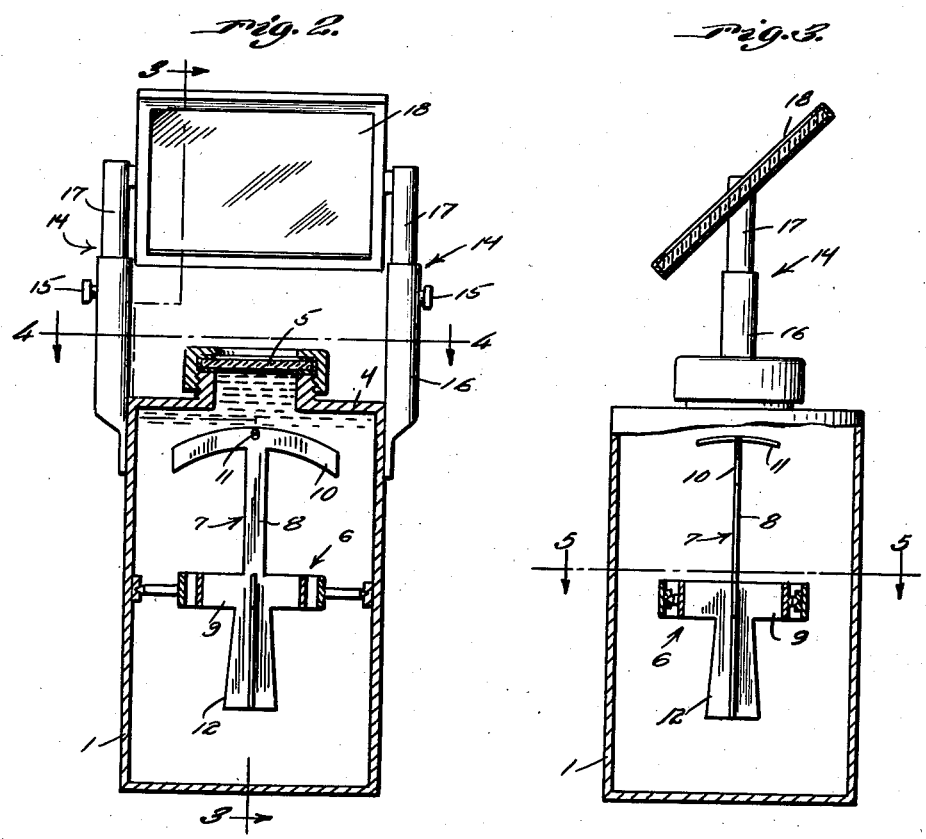
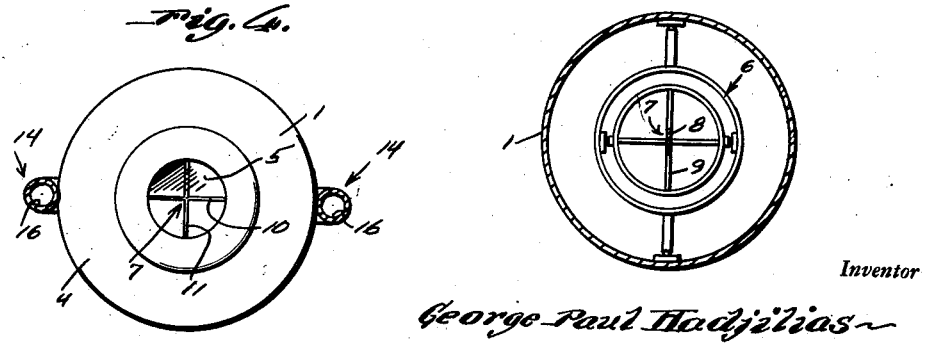
Inventor
George Paul Hadjilias
By Clarence A. O'Brien
Attorney

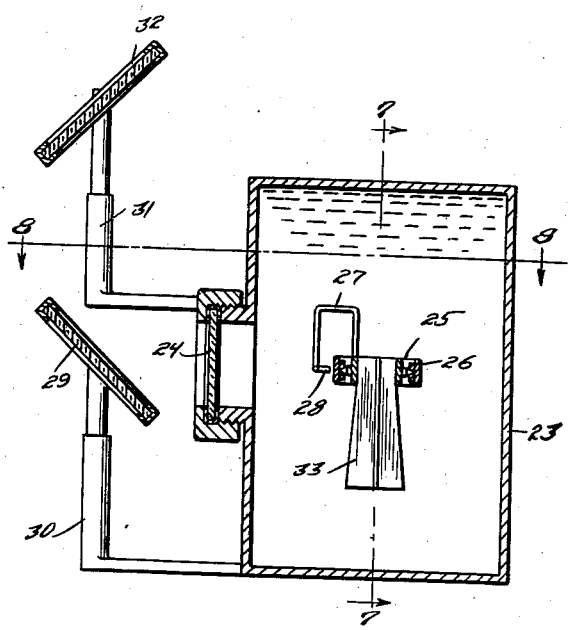
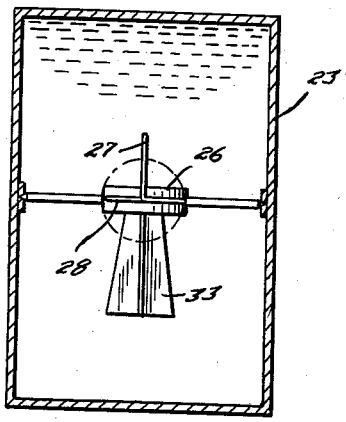
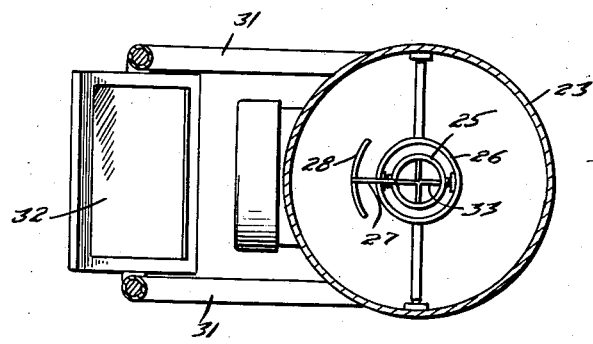

Patented Oct. 6, 1942

2,298,010

UNITED STATES PATENT OFFICE 2,298,010

MARINE ARTIFICIAL HORIZON

George Paul Hadjilias, New York, N. Y.

Application April 16, 1941, Serial No. 388,895

3 Claims. (Cl. 33—73)

The present invention relates to new and useful improvements in artificial horizons particularly for marine sextants and has for its primary object to provide, in a manner as hereinafter set forth, an instrument of this character comprising a gravity controlled fluid stabilized indicator of a novel construction and arrangement whereby vibration will be substantially eliminated, consequent discrepancies and errors reduced to a minimum and maximum accuracy of observation attained with comparative ease.

Other objects of the invention are to provide an artificial horizon of the aforementioned character which will be comparatively simple in construction, strong, durable, compact and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 2 is a view in vertical section through the instrument, taken substantially on the line 2—2 of Figure 1.

Figure 3 is a view principally in vertical section, taken substantially on the line 3—3 of Figure 2.

Figure 4 is a horizontal sectional view, taken substantially on the line 4—4 of Figure 2.

Figure 5 is a view in horizontal section, taken substantially on the line 5—5 of Figure 3.

Figure 6 is a view in vertical section through another form of the instrument.

Figure 7 is a vertical sectional view, taken substantially on the line 7—7 of Figure 6.

Figure 8 is a view in horizontal section, taken substantially on the line 8—8 of Figure 6.

Figure 1:
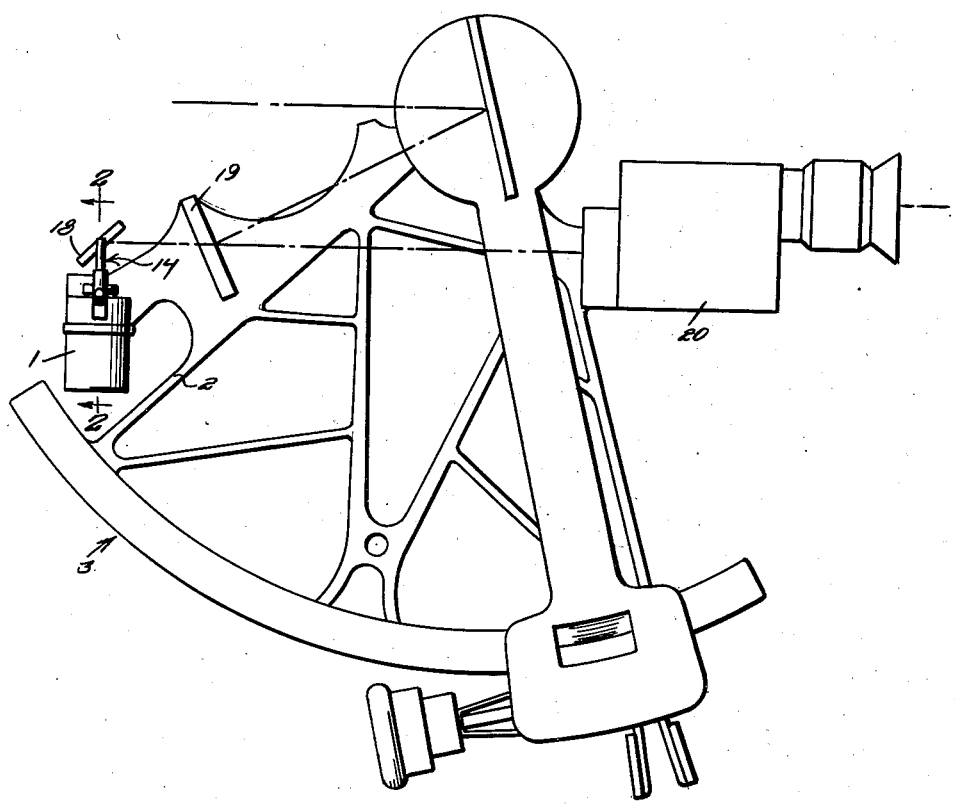
Figure 1 is a view in side elevation, showing an embodiment of the present invention mounted in position on a marine sextant.
Figure 9:
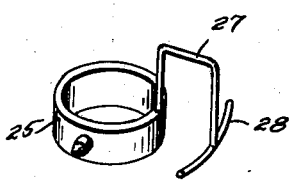
Figure 9 is a perspective view of the indicator and the inner gimbal ring on which it is mounted, said indicator and ring being elements of the modification shown in Figures 6, 7 and 8.

Referring now to the drawings in detail, it will be seen that reference numeral 1 designates a substantially cylindrical reservoir or container of suitable material for the reception of a fluid such, for example, as a mixture of distilled water and alcohol. The container 1 may be of any desired dimensions or capacity. The container 1 is to be mounted in any suitable manner in the correct position on the frame 2 of a conventional marine sextant 3. The top 4 of the container 1 has mounted thereon a window 5.

Mounted horizontally in the container 1 at an intermediate point is a set of gimbal rings 6. The gimbal rings 6 provide means for mounting an indicator 7 for universal swinging movement in the container 1 beneath the lens 5. The indicator 7 includes what may be considered a post 8 of suitable flat, thin material which rises from a base 9 in the form of a cross. The base 9 is mounted in the innermost of the gimbal rings 6. On the upper end of the post 8 is an arcuate T-head 10. Mounted transversely on the head 10 at an intermediate point is an arcuate rod or filament 11. It will thus be seen that a cross is formed beneath the window 5, the arms of which cross are curved downwardly. Depending from the base 9 is a pendulum 12 which is also cross shaped in horizontal section.

Rising from the container 1, on diametrically opposite sides of the window 5, are telescopically adjustable posts 14. Set screws 15 in the lower sections 16 of the posts 14 releasably secure the male upper sections 17 of said posts in adjusted position. Mounted between the posts 14 is an adjustable mirror 18 which is positioned to reflect the indicator 7 through the usual horizon glass 19 into the telescope 20 of the sextant 3.

It is thought that the operation of the device will be readily apparent from a consideration of the foregoing. Briefly, the indicator 7 is maintained by gravity at all times in a true vertical position, regardless of the position of the container 1, through the medium of the pendulum 12. The fluid in the container or reservoir 1 reduces vibration in the indicator 7 to a minimum in a manner which is thought to be obvious, thus greatly facilitating the making of accurate observations. As previously indicated, the indicator 7 is reflected by the mirror 18 through the central portion of the sextant glass 19 into the telescope 20 through which it is transmitted to the eye of the observer.

Figure 10:
Figure 10 is an elevational view, illustrating a slight variation or modification of the fluid reservoir or container shown in Figures 1 to 5, inclusive, of the drawings.

In Figure 10 of the drawings, reference numeral 21 designates a container or reservoir having a rounded upper portion 22 which conforms substantially to the curvature of the elements 10 and 11 of the indicator 7.

Referring now to the modification illustrated in Figs. 6 to 9, inclusive, of the drawings it will be seen that reference numeral 23 designates a container or reservoir, for the reception of a fluid, which reservoir is provided with a window 24 in the front thereof. Mounted in the container 23, in back of the window 24, are inner and outer gimbal rings 25 and 26, respectively. Mounted on the forward portion of the inner ring 25 is a substantially U-shaped indicator 27 having an arcuate crosshead 28 on its free end operable in back of the window 24. The diametrically opposite side of the inner gimbal ring 25 is to be weighted in a manner to counterbalance the indicator 27.

Mounted on the container 23 in front of the window 24 is an adjustable mirror 29. Suitable telescopic brackets 30 support the mirror 29. Mounted on similar brackets 31, above the mirror 29 and at right angles thereto, is a second mirror 32.

In the operation of the modification illustrated in Figures 6 to 9, inclusive, of the drawings, the mirror 29 reflects the indicator 27 into the mirror 32 by which said indicator is reflected through the horizon glass 19 of the sextant 3 into the telescope 20. Fixed in the inner gimbal ring 25 and depending therefrom is a pendulum 33 having the form of a cross in horizontal section. Of course, the pendulum 33 maintains the indicator 27 in a true vertical position at all times regardless of the position of the container 23 and, being operable in the fluid in said container, prevents substantially all vibration.

It is believed that the many advantages of a marine artificial horizon constructed in accordance with the present invention will be readily understood and although preferred embodiments of the instrument are as illustrated and described, it is to be understood that further modifications and changes in the details of construction may be resorted to which will fall within the scope of the invention as claimed.

What is claimed is:

1. An indicator for marine sextants comprising, a container, for the reception of a fluid, mounted on the sextant, said container including a top and a window in said top, an indicator mounted for universal swinging movement in the container beneath the window, a pendulum connected to the indicator for maintaining said indicator in a vertical position and, in conjunction with the fluid in the container, for stabilizing said indicator, a pair of telescopic posts mounted on the container, and an adjustable mirror mounted between said posts above the window for reflecting the indicator into the telescope of the sextant.

2. An indicator for marine sextants comprising a closed container, for the reception of a fluid, mounted on a sextant, a window in said container, an indicator mounted for universal swinging movement in the container, a pendulum operatively connected to the indicator and operable in the fluid, said pendulum being substantially cross-shaped in horizontal section and constituting means for actuating and stabilizing said indicator, telescopically adjustable supports mounted on the container, and means mounted for swinging adjustment on the supports for reflecting the indicator into the telescope of the sextant.

3. An indicator for marine sextants comprising a closed cylindrical container, for the reception of a fluid, mounted vertically on a sextant, a window in said container at an intermediate point, inner and outer gimbal rings mounted in the container, an indicator mounted on the inner ring and operable adjacent the window, a pendulum fixed in said inner ring and operable in the fluid for actuating and stabilizing the indicator, pairs of telescopically adjustable supports mounted on the container, and coacting mirrors mounted for swinging adjustment between said pairs of supports and associated with the window for reflecting the indicator into the telescope of the sextant.

GEORGE PAUL HADJILIAS.